US010759407B2

(12) United States Patent
Hanzawa et al.

(10) Patent No.: US 10,759,407 B2
(45) Date of Patent: Sep. 1, 2020

(54) ELECTRIC PARKING BRAKE DEVICE

(71) Applicant: ADVICS CO., LTD., Kariya-shi, Aichi-ken (JP)

(72) Inventors: Masatoshi Hanzawa, Kariya (JP); Tetsuaki Tsuzuki, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 233 days.

(21) Appl. No.: 15/746,225

(22) PCT Filed: Jul. 27, 2016

(86) PCT No.: PCT/JP2016/071971
§ 371 (c)(1),
(2) Date: Jan. 19, 2018

(87) PCT Pub. No.: WO2017/022584
PCT Pub. Date: Sep. 2, 2017

(65) Prior Publication Data
US 2018/0208170 A1 Jul. 26, 2018

(30) Foreign Application Priority Data

Jul. 31, 2015 (JP) ................................. 2015-152215

(51) Int. Cl.
*B60T 13/74* (2006.01)
*B60T 7/12* (2006.01)
(Continued)

(52) U.S. Cl.
CPC .............. *B60T 13/741* (2013.01); *B60T 7/12* (2013.01); *B60T 8/171* (2013.01); *B60T 8/172* (2013.01);
(Continued)

(58) Field of Classification Search
CPC ....... B60T 13/741; B60T 13/746; B60T 8/172; B60T 8/171; B60T 8/17; B60T 8/00;
(Continued)

(56) References Cited

U.S. PATENT DOCUMENTS 7,448,699 B2 * 11/2008 Manaka .................. B60T 7/122
188/71.9
8,042,887 B2 * 10/2011 Yamamoto .............. B60T 7/042
303/155
(Continued)

FOREIGN PATENT DOCUMENTS

JP 2012-081771 A 4/2012

OTHER PUBLICATIONS

International Search Report (PCT/ISA/210) dated on Sep. 6, 2016, by the Japanese Patent Office as the International Searching Authority for International Application No. PCT/JP2016/071971.

*Primary Examiner* — Bradley T King
*Assistant Examiner* — Mahbubur Rashid
(74) *Attorney, Agent, or Firm* — Buchanan Ingersoll & Rooney PC

(57) ABSTRACT

An electric parking brake device generates pressing force by pressing friction materials against a brake disc by causing a piston to move by motor operation. A control device executes: parking processing wherein the motor increases the pressing force to an initial pressing force higher than a lower-limit pressing force; and re-drive processing wherein the motor is driven and the pressing force increased at a re-drive time, which is a predetermined time after the end of execution of parking processing. During parking processing, the control device uses one among the initial pressing force and the predetermined time, in addition to a pressing force decrease characteristic corresponding to an assumed temperature set for use in calculation, as a basis to calculate the other of the initial pressing force and the predetermined time (Continued)

such that the pressing force becomes equal to or less than the lower-limit pressing force at the re-drive time.

4 Claims, 5 Drawing Sheets

(51) Int. Cl.
| | |
|---|---|
| *F16D 55/226* | (2006.01) |
| *F16D 65/18* | (2006.01) |
| *B60T 8/171* | (2006.01) |
| *B60T 8/172* | (2006.01) |
| *B60T 8/32* | (2006.01) |
| *F16D 66/00* | (2006.01) |
| *F16D 121/24* | (2012.01) |

(52) U.S. Cl.
CPC .............. *B60T 8/32* (2013.01); *B60T 13/74* (2013.01); *B60T 13/746* (2013.01); *F16D 55/226* (2013.01); *F16D 65/18* (2013.01); *F16D 65/183* (2013.01); *F16D 66/00* (2013.01); *F16D 2066/001* (2013.01); *F16D 2066/005* (2013.01); *F16D 2066/006* (2013.01); *F16D 2121/24* (2013.01)

(58) Field of Classification Search
CPC .. F16D 2121/24; F16D 65/18; F16D 2123/00; F16D 2066/001; F16D 2066/006; F16D 55/225; F16D 65/14; F16D 66/00; F16D 2127/06

See application file for complete search history.

(56) References Cited

U.S. PATENT DOCUMENTS

| | | | | |
|---|---|---|---|---|
| 8,430,213 | B2* | 4/2013 | Yokoyama | B60T 13/741 188/1.11 E |
| 2004/0113486 | A1* | 6/2004 | Koga | B60T 13/66 303/20 |
| 2005/0046368 | A1* | 3/2005 | Arakawa | B60T 13/741 318/370 |
| 2005/0077783 | A1* | 4/2005 | Suzuki | B60T 7/107 303/89 |
| 2006/0170282 | A1* | 8/2006 | Yamaguchi | B60T 13/746 303/20 |
| 2011/0074209 | A1* | 3/2011 | Ueno | B60T 13/745 303/20 |
| 2012/0085599 | A1 | 4/2012 | Ito et al. | |
| 2014/0069750 | A1* | 3/2014 | Nohira | B60T 13/741 188/71.8 |
| 2015/0120163 | A1* | 4/2015 | Ohara | B60T 13/662 701/70 |
| 2015/0145321 | A1* | 5/2015 | Yuasa | B60T 8/17 303/3 |
| 2016/0031427 | A1* | 2/2016 | Yasui | B60T 17/22 701/70 |

* cited by examiner

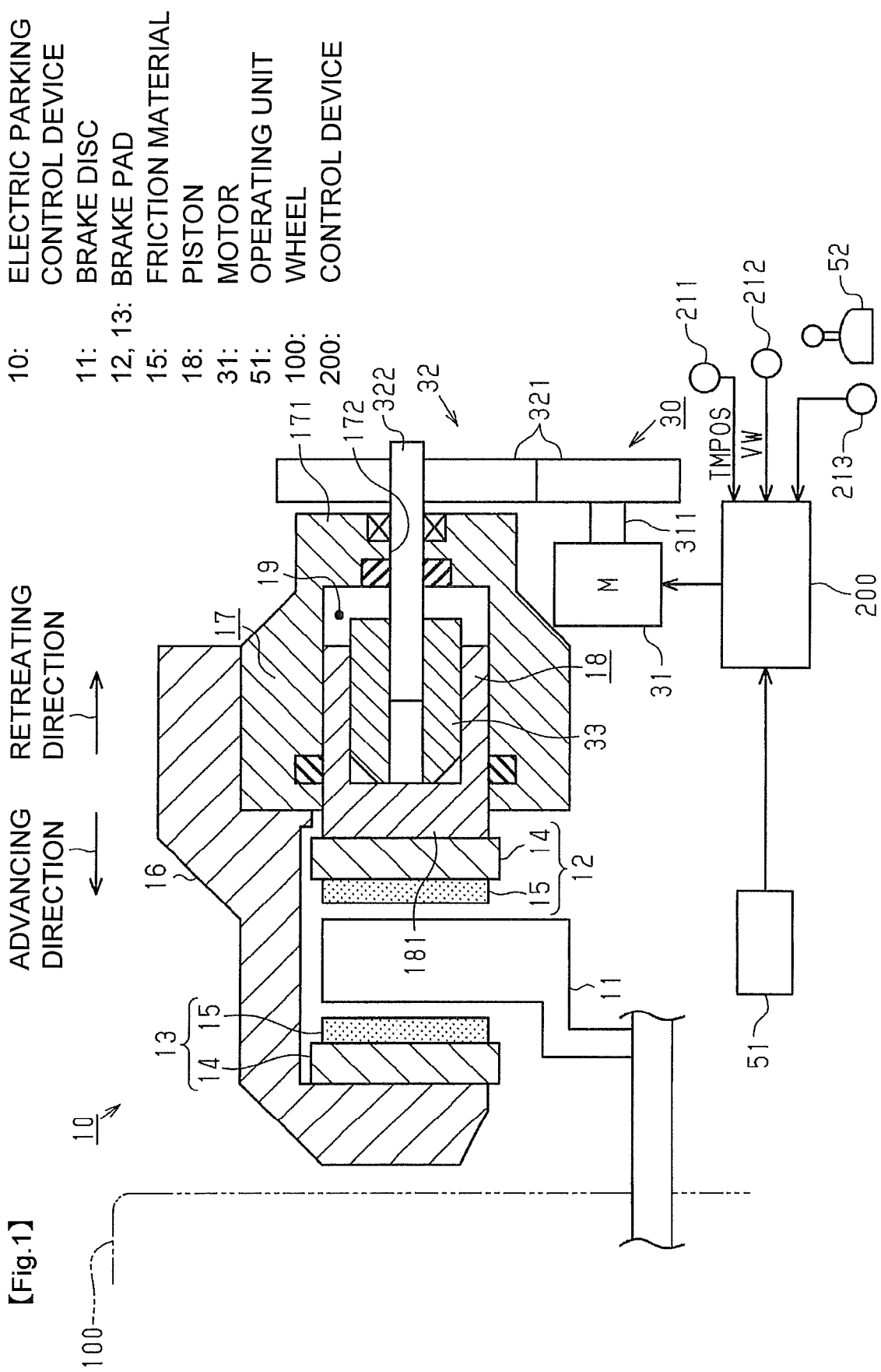

[Fig.2]
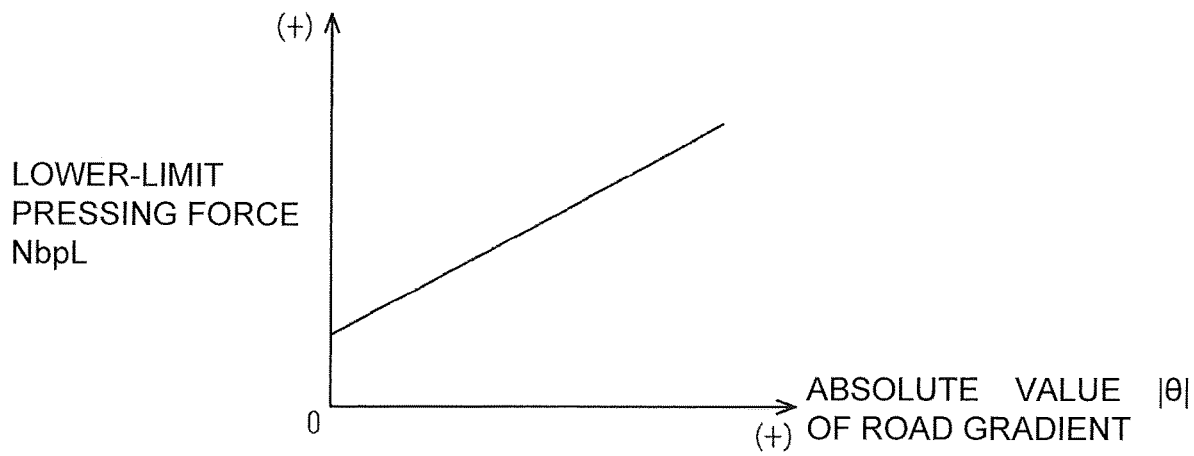
[Fig.3]
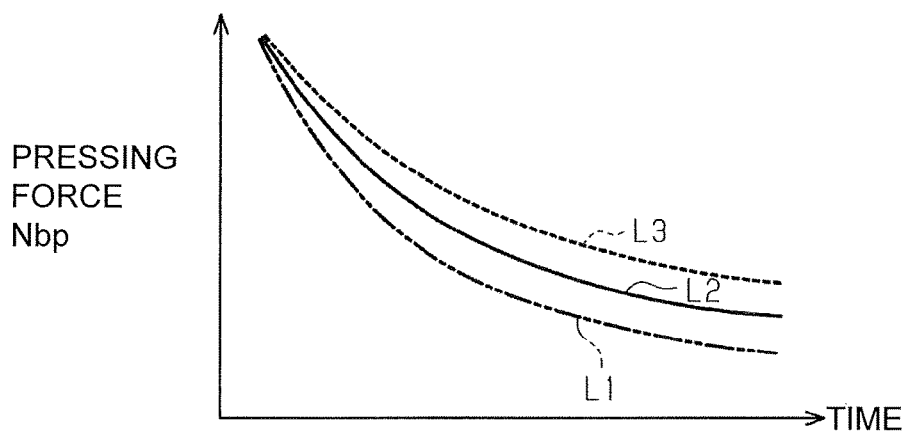
[Fig.4]
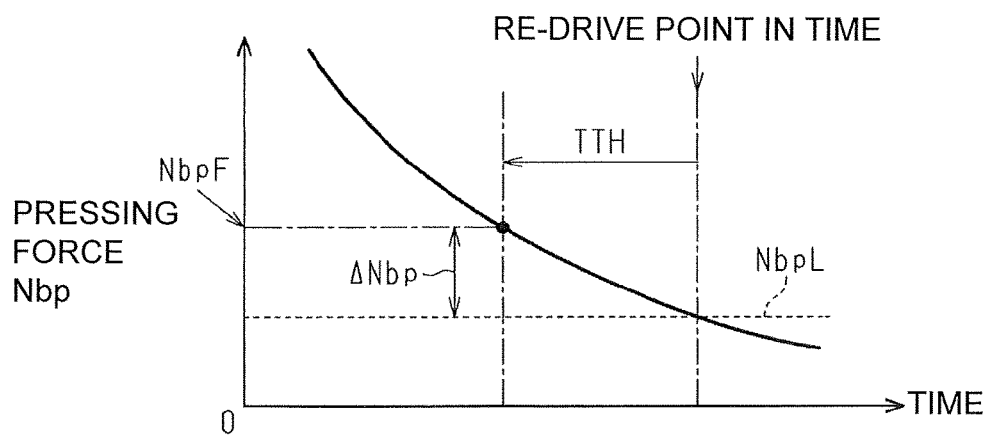

【Fig.5A】
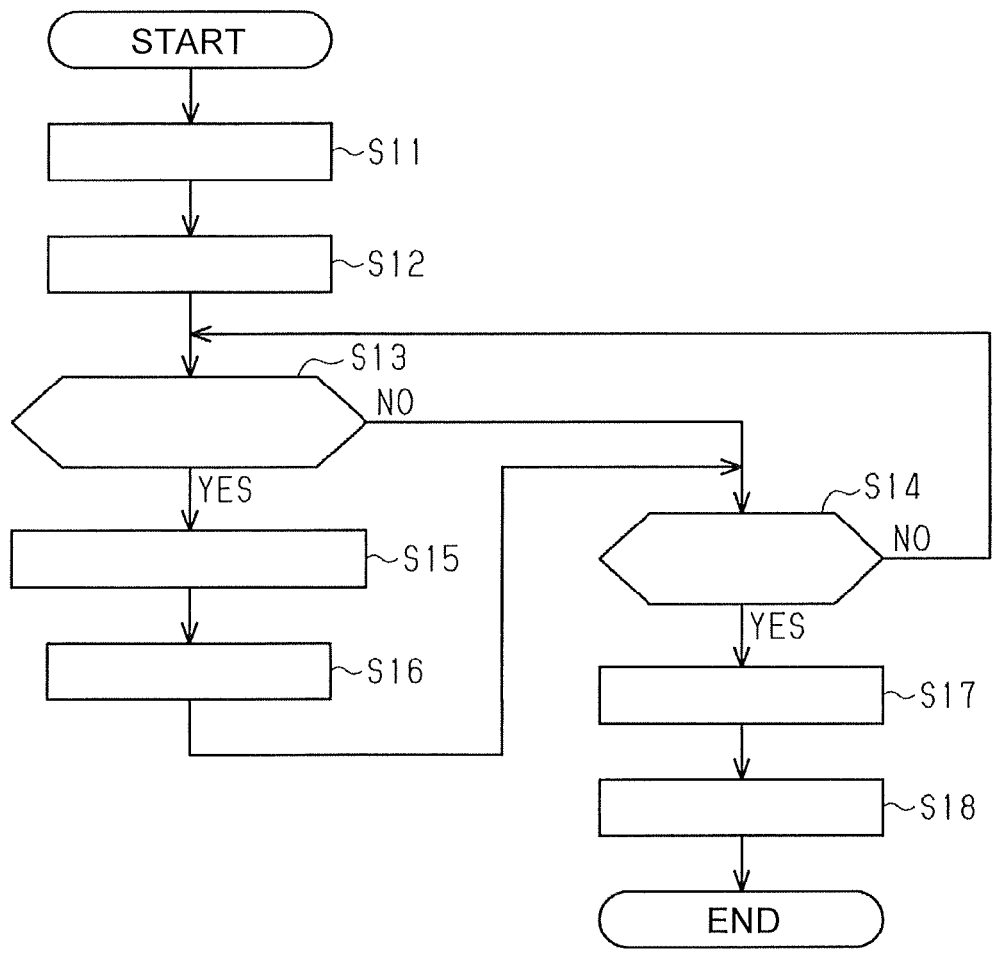
【Fig.5B】
S11: CALCULATE INITIAL PRESSING FORCE NbpF
S12: EXECUTE PARKING PROCESSING
S13: WHEEL SPEED VW ≧ ROTATION DETERMINATION SPEED VWTH? S14: ELAPSED TIME T ≧ PREDETERMINED TIME TTH?
S15: CALCULATE RESET PRESSING FORCE NbpS
S16: EXECUTE CORRECTED DRIVE PROCESSING
S17: RE-DRIVE PROCESSING
S18: PERMIT FUNCTION STOP

[Fig.6]
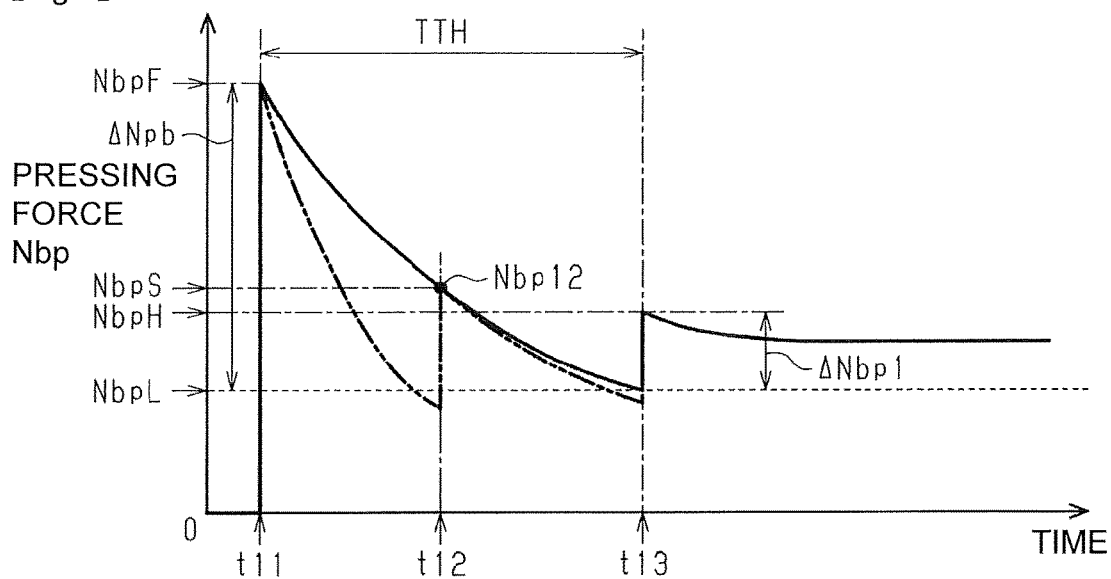
[Fig.7A]
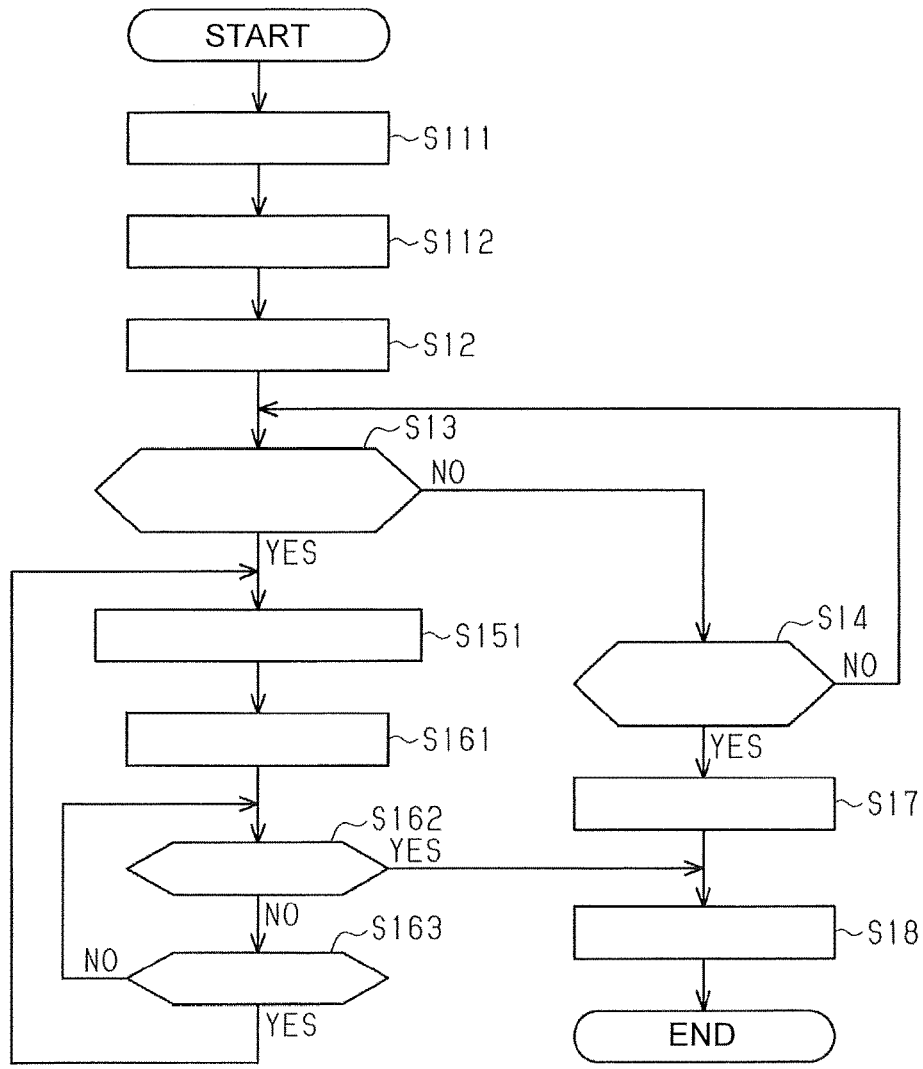

[Fig.7B]
S111: CALCULATE INITIAL PRESSING FORCE NbpF
S112: CALCULATE PREDETERMINED TIME TTH
S151: CALCULATE RESET PRESSING FORCE NbpS
S161: EXECUTE CORRECTED DRIVE PROCESSING
[Fig.8]
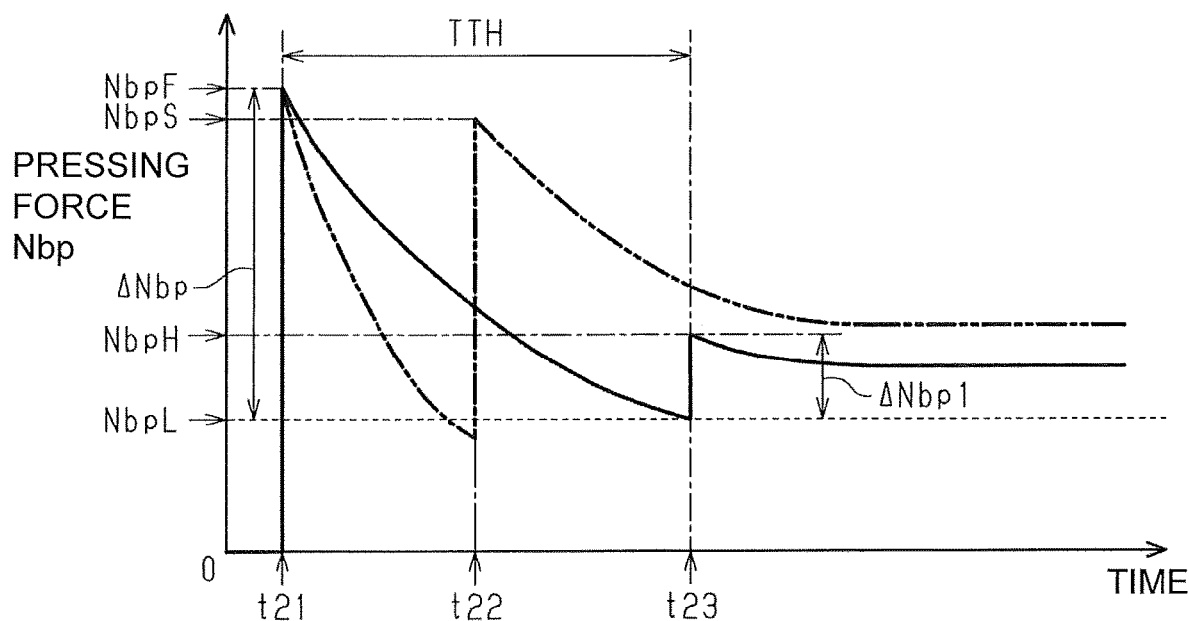

ELECTRIC PARKING BRAKE DEVICE

TECHNICAL FIELD

The present invention relates to an electric parking brake device provided in a vehicle.

BACKGROUND ART

Patent Literature 1 discloses an example of an electric parking brake device which adjusts, by a driving amount of a motor, a pressing force being a force to press a brake pad being an example of a friction material to a brake disc being an example of a rotating body integrally rotating with a wheel. In parking processing executed by such device, a shaft member moves in an axial direction to press the brake pad by driving of the motor. Then, the brake pad is brought into contact with the brake disc to be pressed against the same. When the pressing force reaches an initial pressing force, the driving of the motor is stopped.

Meanwhile, there is a case where the brake pad expands due to an increase in temperature. In a case where the parking processing is executed in a situation in which temperature of the brake pad is high and the brake pad is expanded, there is a case where the brake pad contracts due to a decrease in temperature of the brake pad thereafter and the pressing force decreases. Since this pressing force corresponds to a braking force applied to the wheel, the braking force applied to the wheel decreases when the pressing force decreases.

Therefore, in the device disclosed in Patent Literature 1, when a predetermined time elapses after the execution of the parking processing ends, the motor is re-driven, and it is determined whether the pressing force decreases on the basis of a changing mode of a current value with respect to the motor. When it is determined that the pressing force decreases, a current target value is increased, and the motor is continuously re-driven until the value of the current flowing to the motor reaches the current target value.

CITATIONS LIST

Patent Literature

Patent Literature 1: Japanese Unexamined Patent Application Publication No. 2012-81771

SUMMARY OF INVENTION

Technical Problems

In a case where the parking processing is executed in a situation in which the temperature of the brake pad is high, the brake pad significantly contracts in accordance with a decrease in temperature of the brake pad thereafter, so that the pressing force is likely to decrease. On the other hand, in a case where the parking processing is executed in a situation in which the temperature of the brake pad is not high, since the temperature of the brake pad does not decrease so much, the brake pad does not contract too much and the pressing force hardly decreases.

However, in the electric parking brake device described above, when a predetermined time elapses from the end of the execution of the parking processing, the motor is re-driven regardless of a decrease amount of the pressing force. That is, in a case where a lower-limit value of the pressing force capable of maintaining the vehicle in a stopping state is set as a lower-limit pressing force, even when the pressing force is sufficiently larger than the lower-limit pressing force, if a predetermined time elapses from the end of the execution of the parking processing, the motor is re-driven.

An object of the present invention is to provide an electric parking brake device capable of suppressing an increase in power consumption at the time of parking.

Solutions to Problems

An electric parking brake device for solving the above-described problem is a device provided with a rotating body integrally rotating with a wheel, a friction material, a motor, a shaft member which moves in an axial direction by driving of the motor to press the friction material against the rotating body, and a control device which moves the shaft member by the driving of the motor, thereby pressing the friction material against the rotating body to generate a pressing force. In this electric parking brake device, when a lower-limit value of the pressing force capable of holding a stopping state of a vehicle is referred to as a lower-limit pressing force, the control device executes parking processing of increasing the pressing force to an initial pressing force larger than the lower-limit pressing force by driving the motor, and re-drive processing of increasing the pressing force by driving the motor at a re-drive point in time at which a predetermined time has elapsed after the end of execution of the parking processing. The control device calculates one of the initial pressing force and the predetermined time on the basis of the other of the initial pressing force and the predetermined time and a decrease characteristic of the pressing force according to assumed temperature set for calculation such that the pressing force is not larger than the lower-limit pressing force at the re-drive point in time when executing the parking processing.

If a characteristic of a unit including the friction material and the rotating body may be grasped in advance, it is possible to grasp a cooling characteristic of the friction material, that is, a contraction characteristic of the friction material under a specific condition. Then, in a situation in which the friction material is pressed against the rotating body, the pressing force is decreased as the friction material contracts. Therefore, by grasping the contraction characteristic of the friction material in advance, it is possible to estimate a decrease amount of the pressing force from the end of the execution of the parking processing to the re-drive point in time.

Therefore, for example, in a case where the predetermined time and the above-described assumed temperature are set, it is possible to estimate the decrease amount of the pressing force within the period from the end of the execution of the parking processing to the re-drive point in time, so that it is possible to calculate the initial pressing force such that the pressing force is not larger than the lower-limit pressing force at the re-drive point in time. Also, for example, in a case where the initial pressing force and the above-described assumed temperature are set, it is possible to estimate the decrease amount of the pressing force within the period from the end of the execution of the parking processing to the re-drive point in time, so that it is possible to calculate the predetermined time such that the pressing force is not larger than the lower-limit pressing force at the re-drive point in time.

Meanwhile, if the pressing force becomes smaller than the lower-limit pressing force due to the contraction of the friction material caused by a decrease in temperature, there is a possibility that the wheel starts rotating due to a decrease in braking force applied to the wheel.

In the above-described configuration, on the basis of one of the initial pressing force and the predetermined time and the decrease characteristic of the pressing force according to the assumed temperature, the other of the initial pressing force and the predetermined time is calculated such that the pressing force is not larger than the lower-limit pressing force at the re-drive point in time. Thereby, it is possible to make a relationship between the initial pressing force and the predetermined time. That is, when the parking processing is executed, there is a possibility that the pressing force is not larger than the lower-limit pressing force at the re-drive point in time. Therefore, at the re-drive point in time, since there is a possibility that the wheel starts rotating, the re-drive processing is executed. As a result, a phenomenon in which the re-drive processing is executed in a situation in which the pressing force is sufficiently larger than the lower-limit pressing force and the possibility that the wheel starts rotating is infinitely low hardly occurs. Therefore, it is possible to suppress an increase in power consumption at the time of parking.

BRIEF DESCRIPTION OF DRAWINGS

FIG. 1 is a configuration diagram schematically illustrating an electric parking brake device of a first embodiment.

FIG. 2 illustrates a map for determining a lower-limit pressing force on the basis of an absolute value of a gradient of a road surface on which a vehicle is located in this electric parking brake device.

FIG. 3 is a timing chart for illustrating a state in which a decrease mode of a pressing force differs according to temperature of a friction material in this electric parking brake device.

FIG. 4 is a map for determining an initial pressing force in this electric parking brake device.

FIGS. 5A and 5B are flowcharts illustrating a processing routine executed by a control device when parking braking is requested in this electric parking brake device.

FIG. 6 is a timing chart illustrating transition of the pressing force after execution of parking processing in this electric parking brake device.

FIGS. 7A and 7B are flowcharts illustrating a processing routine executed by a control device when parking braking is requested in an electric parking brake device of a second embodiment.

FIG. 8 is a timing chart illustrating transition of a pressing force after execution of parking processing in this electric parking brake device.

DESCRIPTION OF EMBODIMENTS

First Embodiment

A first embodiment embodying an electric parking brake device is hereinafter described with reference to FIGS. 1 to 6.

As illustrated in FIG. 1, an electric parking brake device 10 is provided with a brake disc 11 being an example of a rotating body integrally rotating with a wheel 100 and a pair of brake pads 12 and 13 arranged on both sides in a vehicle width direction of the brake disc 11. Each of the brake pads 12 and 13 includes a back plate 14 and a friction material 15 fixed to the back plate 14. When the brake pads 12 and 13 approach the brake disc 11 and the friction materials 15 are pressed against the brake disc 11, a braking force corresponding to a pressing force being a force to press the friction materials 15 against the brake disc 11 is applied to the wheel 100. That is, it is possible to increase the braking force applied to the wheel 100 by increasing the pressing force.

A caliper 16 which supports both the brake pads 12 and 13 such that they may move in directions to approach and separate from the brake disc 11 is also provided on the electric parking brake device 10. Out of the brake pads 12 and 13, the brake pad 12 is located on an inner side in the vehicle width direction as compared to the brake disc 11, and a cylinder main body 17 located on an inner side in the vehicle width direction as compared to the brake pad 12 is provided on the caliper 16. The cylinder main body 17 has a bottomed, substantially cylindrical shape closed on an inner side in the vehicle width direction and opened on an outer side in the vehicle width direction. Such cylinder main body 17 supports a piston 18 being an example of a shaft member such that this may slide in the vehicle width direction. That is, in this specification, the vehicle width direction corresponds to an axial direction being a moving direction of the shaft member.

The piston 18 has a bottomed, substantially tubular shape closed on an outer side in the vehicle width direction and opened on an inner side in the vehicle width direction. The piston 18 closes the opening of the cylinder main body 17, and a cylinder chamber 19 is sectioned by the piston 18 and the cylinder main body 17. When such piston 18 slides outward in the vehicle width direction to the left in the drawing, both the brake pads 12 and 13 are pressed by the piston 18 to approach the brake disc 11. On the other hand, when the piston 18 slides inward in the vehicle width direction to the right in the drawing, pressing of both the brake pads 12 and 13 by the piston 18 is released, and both the brake pads 12 and 13 separate from the brake disc 11. That is, in this specification, the left side in the drawing on the outer side in the vehicle width direction corresponds to an "advancing direction", and the right side in the drawing on the inner side in the vehicle width direction corresponds to a "retreating direction".

Meanwhile, brake fluid is externally supplied to the cylinder chamber 19 in the cylinder main body 17. In a case where a hydraulic pressure in the cylinder chamber 19 increases, the piston 18 slides in the advancing direction, and in a case where the hydraulic pressure in the cylinder chamber 19 decreases, the piston 18 slides in the retreating direction. That is, it is possible to control the braking force applied to the wheel 100, namely, a normal braking force, by adjusting the hydraulic pressure in the cylinder chamber 19. The hydraulic pressure in the cylinder chamber 19 may be adjusted by operation of a brake actuator provided with a pump, an amount of operation of a brake pedal by a driver and the like.

The electric parking brake device 10 is also provided with a motor 31 capable of rotating an output shaft 311 in both forward and backward directions, a deceleration mechanism 32 which decreases a rotational speed of the output shaft 311 of the motor 31 to output, a nut member 33 connected to the deceleration mechanism 32 to move in the advancing or retreating direction. In this specification, a unit including the motor 31, the deceleration mechanism 32, and the nut member 33 is referred to as a "parking unit 30".

The deceleration mechanism 32 includes a plurality of gears 321 arranged outside the cylinder main body 17. When the output shaft 311 of the motor 31 rotates, the gears 321 rotate in directions according to a rotational direction of the output shaft 311. A through hole 172 is provided at the center of a bottom wall 171 of the cylinder main body 17 so as to penetrate the same in the vehicle width direction, and the deceleration mechanism 32 is provided with a rod member 322 inserted into the through hole 172 of the bottom wall 171. The rod member 322 rotates in accordance with the rotation of the gear 321 and is rotatably supported by the bottom wall 171 of the cylinder main body 17. A peripheral surface of a portion located in the cylinder main body 17 of the rod member 322 is subjected to male screw processing.

The nut member 33 is arranged in the cylinder chamber 19, more specifically, on an inner side of the piston 18. An inner peripheral surface of the nut member 33 is subjected to female screw processing, so that the nut member 33 and the rod member 322 screw together. Therefore, as the rod member 322 rotates by the driving of the motor 31, the nut member 33 moves in the advancing or retreating direction. That is, the rod member 322 and the nut member 33 form a conversion mechanism which converts rotational motion of the motor 31 into linear motion and transmits the same to the piston 18.

Meanwhile, in this specification, the driving of the motor 31 when moving the nut member 33 in the advancing direction is referred to as forward driving and the driving of the motor 31 when moving the nut member 33 in the retreating direction is referred to as backward driving. The rotational direction of the output shaft 311 at the time of the forward driving of the motor 31 corresponds to a "forward direction", and the rotational direction of the output shaft 311 at the time of the backward driving of the motor 31 corresponds to a "backward direction".

As illustrated in FIG. 1, an operating unit 51, an outside air temperature sensor 211, a wheel speed sensor 212, a range detection sensor 213 and the like are electrically connected to a control device 200 of the electric parking brake device 10. The operating unit 51 provided in a vehicle interior is operated by an occupant of the vehicle when parking braking is executed or when parking braking is released. The outside air temperature sensor 211 detects outside air temperature TMPOS out of the vehicle equipped with the electric parking brake device 10. The outside air temperature TMPOS corresponds to temperature of an environment in which the electric parking brake device 10 is used. The wheel speed sensor 212 detects a wheel speed VW being a rotational speed of the wheel 100. The range detection sensor 213 detects a range selected by a shift device 52 provided on the vehicle. The control device 200 controls the parking unit 30 on the basis of information detected by the various types of detection systems.

Such control device 200 is provided with a microcomputer formed of a CPU, a memory and the like. The CPU executes a program written in the memory, thereby controlling the parking unit 30.

That is, when the operating unit 51 is turned on, parking processing is executed by the control device 200. As a result, the motor 31 drives forward, and the nut member 33 moves in the advancing direction. Then, a bottom wall 181 of the piston 18 is pressed by the nut member 33, and the piston 18 slides in the advancing direction. As a result, both the brake pads 12 and 13 approach the brake disc 11, and the friction materials 15 of both the brake pads 12 and 13 are pressed against the brake disc 11. As a result, the braking force according to the pressing force (which may also be referred to as an "axial force") being a force to press the friction materials 15 against the brake disc 11, that is, a parking braking force is applied to the wheel 100. When it is determined that the pressing force becomes equal to an initial pressing force to be described later, the forward driving of the motor 31 is stopped. When the forward driving of the motor 31 is stopped in this manner, a position in the axial direction of the piston 18 is held.

On the other hand, when the operating unit 51 is turned off in a situation in which the parking braking force is applied to the wheel 100, the motor 31 drives backward, and the nut member 33 moves in the retreating direction. When the bottom wall 181 of the piston 18 is no longer pressed by the nut member 33, the piston 18 also slides in the retreating direction by utilizing an elastic returning force of each unit and the like. Then, the pressing force gradually decreases, and eventually both the brake pads 12 and 13 separate from the brake disc 11. As a result, a state in which the parking braking force is applied to the wheel 100 is released.

As described above, the friction materials 15 of the brake pads 12 and 13 are pressed against the brake disc 11 not only at the time of parking braking but also at the time of normal braking. Therefore, there is a case where the temperature of the friction material 15 is high and the friction material 15 is expanded depending on a situation in which normal braking is executed before the parking processing is executed. In a case where the parking processing is executed in such situation, there is a case where a pressing force Nbp decreases due to contraction of the friction material 15 caused by a decrease in temperature of the friction material 15. When the pressing force Nbp decreases in this manner, the parking braking force applied to the wheel 100 might decrease.

Therefore, in the electric parking brake device 10 according to this embodiment, it is configured to execute re-drive processing of increasing the pressing force at a re-drive point in time at which a predetermined time TTH has elapsed after the end of execution of the parking processing. When an ignition switch of the vehicle is turned off at the time when the execution of the re-drive processing ends, a function of the control device 200 is stopped. When the function of the control device 200 is stopped in this manner, the rotation of the wheel 100 cannot be monitored by the control device 200 using the wheel speed sensor 212; however, power consumption in the electric parking brake device 10 is smaller than that when the function of the control device 200 is not stopped.

In the electric parking brake device 10 according to this embodiment, the predetermined time TTH is a value set in advance, whereas an initial pressing force NbpF used at the time of the parking processing is variable. That is, in a case where a lower-limit value of the pressing force which may hold a stopping state of the vehicle is a lower-limit pressing force NbpL, the initial pressing force NbpF is calculated such that the pressing force Nbp becomes equal to the lower-limit pressing force NbpL at the re-drive point in time.

Next, a method of calculating the initial pressing force NbpF is described with reference to FIGS. 2 to 4.

First, the lower-limit pressing force NbpL is calculated. The parking braking force applied to the wheel 100 correlates with the pressing force Nbp. Therefore, as illustrated in FIG. 2, as an absolute value $|\theta|$ of a road surface gradient being a gradient of a road surface on which the vehicle is located is larger, the lower-limit pressing force NbpL is made larger. However, an actual lower-limit pressing force might vary depending on not only the absolute value $|\theta|$ of the road surface gradient but also a $\mu$ value of the road surface, a vehicle weight at that time and the like. Therefore, the lower-limit pressing force NbpL determined according to the absolute value $|\theta|$ of the road surface gradient may also be corrected on the basis of the $\mu$ value of the road surface, the vehicle weight and the like. Then, the initial pressing force NbpF is set to a value larger than the lower-limit pressing force NbpL calculated in this manner.

A characteristic of the friction material 15 of the brake pads 12 and 13 may be grasped in advance. Therefore, it is possible to grasp a cooling characteristic, that is, a contraction characteristic of the friction material 15 under a specific condition (for example, a wind speed in an environment in which the electric parking brake device 10 is installed is 0 (zero) m/s). Then, in a situation in which the friction material 15 is pressed against the brake disc 11, the pressing force Nbp decreases as the friction material 15 contracts. Therefore, by grasping the contraction characteristic of the friction material 15 in advance, it is possible to estimate a decrease amount of the pressing force Nbp within a period from when the parking processing is executed to the re-drive point in time.

FIG. 3 illustrates a decrease characteristic of the pressing force Nbp according to the temperature of the friction material 15 (specifically, difference between the outside air temperature TMPOS and the temperature of the friction material 15). That is, as time elapses, the friction material 15 contracts due to a decrease in temperature, so that the pressing force Nbp gradually decreases. At that time, a decreasing speed of the pressing force being a decrease amount of the pressing force Nbp per unit time decreases with the lapse of time. When the temperature of the friction material 15 becomes substantially equal to the outside air temperature TMPOS, the friction material 15 does not contract anymore, so that the pressing force Nbp hardly changes.

Meanwhile, there are three lines L1, L2, L3 in FIG. 3. A first line L1 being a dashed-two dotted line is a line indicating the decrease characteristic of the pressing force Nbp in a case where the difference between the temperature of the friction material 15 and the outside air temperature TMPOS is relatively large. A third line L3 being a broken line is a line indicating the decrease characteristic of the pressing force Nbp in a case where the difference between the temperature of the friction material 15 and the outside air temperature TMPOS is relatively small. A second line L2 being a solid line is a line indicating the decrease characteristic of the pressing force Nbp in a case where the difference between the temperature of the friction material 15 and the outside air temperature TMPOS is medium. That is, it may be predicted that, as the difference between the temperature of the friction material 15 and the outside air temperature TMPOS at the time of execution of the parking processing is larger, the decrease amount of the pressing force Nbp within the period from this point in time to the re-drive point in time increases.

As illustrated in FIG. 4, in the electric parking brake device 10 of this embodiment, the difference between the temperature of the friction material 15 and the outside air temperature TMPOS at the time of the execution of the parking processing is supposed to be assumed temperature TMPAS set in advance for calculation, and the initial pressing force NbpF is calculated on the basis of the decrease characteristic of the pressing force according to the assumed temperature TMPAS and the predetermined time TTH. Specifically, in the control device 200, a map indicated by a solid line in FIG. 4 is prepared in advance. This map is a map illustrating transition of the pressing force Nbp when the difference between the temperature of the friction material 15 and the outside air temperature TMPOS is equal to the assumed temperature TMPAS under the above-described specific condition, the map illustrating the decrease characteristic of the pressing force according to the assumed temperature TMPAS.

In FIG. 4, a decrease mode of the pressing force Nbp is indicated by the solid line and the lower-limit pressing force NbpL is indicated by a broken line. Therefore, timing at which the solid line and the broken line intersect corresponds to the re-drive point in time when the pressing force Nbp is equal to the lower-limit pressing force NbpL. In this manner, the pressing force Nbp at timing earlier by the predetermined time TTH than the timing corresponding to the re-drive point in time corresponds to the initial pressing force NbpF. Meanwhile, a pressing force increase amount ΔNbp being difference obtained by subtracting the lower-limit pressing force NbpL from the initial pressing force NbpF increases as the lower-limit pressing force NbpL at that time is larger, and corresponds to a predicted decrease amount of the pressing force within the period from the end of the execution of the parking processing to the re-drive point in time.

The assumed temperature TMPAS is set to temperature lower than a maximum value of the temperature which the friction material 15 may reach in design. This is because the temperature of the friction material 15 hardly reaches the maximum value at the time of the braking of the vehicle. For example, the assumed temperature TMPAS is set to a value approximately half the maximum value of the temperature which the friction material 15 may reach in setting. Therefore, deviation between the difference between the actual temperature of the friction material 15 and the outside air temperature TMPOS at the time of execution of the parking braking and the assumed temperature TMPAS may be suppressed.

Next, a processing routine executed by the control device 200 when the parking braking is executed is described with reference to a flowchart illustrated in FIGS. 5A and 5B. For example, this processing routine is executed when the parking braking is requested by turn-on operation of the operating unit 51. Meanwhile, even if the ignition switch of the vehicle is turned off during the execution of this processing routine, the execution of the processing routine is continued.

As illustrated in FIG. 5A, the control device 200 calculates the initial pressing force NbpF on the basis of the map illustrated in FIG. 4 illustrating the decrease characteristic of the pressing force according to the assumed temperature TMPAS and the predetermined time TTH (step S11). Then, the control device 200 executes the parking processing of increasing the pressing force Nbp to the initial pressing force NbpF by the forward driving of the motor 31 (step S12). For example, in the parking processing, the motor 31 is driven forward until current flowing through the motor 31 reaches a current determination value according to the initial pressing force NbpF.

When the execution of the parking processing ends, the control device 200 determines whether the wheel speed VW of the wheel 100 detected by the wheel speed sensor 212 is equal to or higher than a rotation determination speed VWTH (step S13). The rotation determination speed VWTH is a determination value for detecting the rotation of the wheel 100 to which the parking braking force is applied. Therefore, when the wheel speed VW is lower than the rotation determination speed VWTH, the rotation of the wheel 100 is not detected, whereas when the wheel speed VW is equal to or higher than the rotation determination speed VWTH, the rotation of the wheel 100 is detected.

In a case where the wheel speed VW is lower than the rotation determination speed VWTH (step S13: NO), the control device 200 obtains an elapsed time T from the end of the execution of the parking processing, and determines whether the elapsed time T becomes equal to or longer than the predetermined time TTH (step S14). In this case, the control device 200 may regard a point in time when it shifts from a state in which the elapsed time T is shorter than the predetermined time TTH to a state in which the elapsed time T is equal to or longer than the predetermined time TTH as the re-drive point in time. In a case where the elapsed time T is shorter than the predetermined time TTH (step S14: NO), the control device 200 shifts the procedure to step S13 described above. On the other hand, in a case where the elapsed time T is not shorter than the predetermined time TTH (step S14: YES), the control device 200 shifts the procedure to step S17 to be described below. That is, the electric parking brake device 10 of this embodiment monitors whether the wheel 100 starts rotating within the period from the end of the execution of the parking processing to the re-drive point in time.

On the other hand, in a case where the wheel speed VW is equal to or higher than the rotation determination speed VWTH at step S13 (YES), the control device 200 calculates a reset pressing force NbpS (step S15). The reset pressing force NbpS is set to a value such that the pressing force Nbp is equal to the lower-limit pressing force NbpL at the re-drive point in time. That is, the control device 200 calculates the reset pressing force NbpS on the basis of the map illustrated in FIG. 4 illustrating the decrease characteristic of the pressing force according to the assumed temperature TMPAS and remaining time (=TTH−T) according to difference obtained by subtracting a current elapsed time T from the predetermined time TTH. More specifically, the pressing force Nbp at timing earlier by the above-described remaining time than the timing corresponding to the re-drive point in time in the map illustrated in FIG. 4 is set as the reset pressing force NbpS. Therefore, the reset pressing force NbpS is set to a value larger than the lower-limit pressing force NbpL, the value which is larger as the remaining time is longer.

Subsequently, the control device 200 executes corrected drive processing of increasing the pressing force Nbp to the reset pressing force NbpS by the forward driving of the motor 31 (step S16). For example, in the corrected drive processing, the motor 31 is driven forward until the current flowing through the motor 31 reaches the current determination value according to the reset pressing force NbpS. When the execution of the corrected drive processing ends, the control device 200 shifts the procedure to step S14 described above.

At step S17, the control device 200 executes re-drive processing of increasing the pressing force Nbp to a stop holding pressing force NbpH being a sum of the lower-limit pressing force NbpL and an allowance increase amount ΔNbp1 by the forward driving of the motor 31. For example, in the re-drive processing, the motor 31 is driven forward until the current flowing through the motor 31 reaches the current determination value according to the stop holding pressing force NbpH. The allowance increase amount ΔNbp1 is set to a value at which a stopping state of the vehicle may be maintained even if the pressing force Nbp decreases due to the decrease in temperature of the friction material 15 after the execution of the re-drive processing ends.

When the execution of the re-drive processing ends, the control device 200 permits function stop (step S18), and ends this processing routine. Meanwhile, when the ignition switch of the vehicle is turned off at the time when the function stop is permitted in this manner, the function of the control device 200 is stopped and it becomes impossible to monitor whether the wheel 100 rotates.

Next, an action of the electric parking brake device 10 of this embodiment is described with reference to a timing chart illustrated in FIG. 6. Meanwhile, as a premise, it is assumed that the ignition switch of the vehicle is turned off before third timing t13.

As illustrated in FIG. 6, when the operating unit 51 is turned on at first timing t11, the pressing force Nbp is increased up to the initial pressing force NbpF calculated prior to the execution of the parking processing by the execution of the parking processing (step S12). Thereafter, the pressing force Nbp is decreased by the contraction of the friction material 15 caused by the decrease in temperature of the friction materials 15 of the brake pads 12 and 13.

At that time, in a case where the difference between the actual temperature of the friction material 15 and the outside air temperature TMPOS at the time of the execution of the parking processing is substantially equal to the assumed temperature TMPAS and a condition of the environment in which the electric parking brake device 10 is used is substantially the same as the above-described specific condition, the pressing force Nbp decreases in a mode indicated by a solid line in FIG. 6. Therefore, at the third timing t13 at which the predetermined time TTH has elapsed after the first timing t11 (step S14: YES), the pressing force Nbp is substantially equal to the lower-limit pressing force NbpL. Then, there is a possibility that the wheel 100 to which the parking braking force is applied starts rotating at the third timing t13 being the re-drive point in time, so that the pressing force Nbp is increased to the reset pressing force NbpS by the execution of the re-drive processing (Step S17). Thereafter, the function of the control device 200 is stopped (step S18). Therefore, even in a case where the predetermined time TTH is fixed, an increase in the power consumption at the time of parking may be suppressed by setting the initial pressing force NbpF to an appropriate value.

On the other hand, there is a case where the electric parking brake device 10 is used under a condition that the brake pads 12 and 13 are more likely to be cooled than under the above-described specific condition, or the difference between the actual temperature of the friction material 15 and the outside air temperature TMPOS at the time of the execution of the parking processing is extremely larger than the assumed temperature TMPAS. In this case, as indicated by a dashed-two dotted line in FIG. 6, the decreasing speed of the pressing force Nbp is higher than an assumed decreasing speed (that is, the decreasing speed indicated by the solid line in FIG. 6). When the decreasing speed of the pressing force Nbp is high in this manner, there is a case where the pressing force Nbp becomes smaller than the lower-limit pressing force NbpL before the third timing t13 being the re-drive point in time and the wheel 100 starts rotating at second timing t12 before the third timing t13 (step S13: YES).

Then, at the second timing t12, the reset pressing force NbpS is calculated (step S15), and the corrected drive processing is executed (step S16). In a case where the pressing force Nbp at the second timing t12 assumed at the time of the execution of the parking processing is a pressing force Nbp12, the reset pressing force NbpS is made a value equal to the pressing force Nbp12. Then, by the forward driving of the motor 31, the pressing force Nbp is increased to such reset pressing force NbpS. As a result, it is possible to suppress the vehicle on which the parking braking is executed from starting. Even after the corrected drive processing is executed, the pressing force Nbp is decreased due to the decrease in temperature of the friction material 15. That is, the pressing force Nbp approaches the lower-limit pressing force NbpL.

Even when the corrected drive processing is executed in this manner, the pressing force Nbp is less likely to be larger than the lower-limit pressing force NbpL at the re-drive point in time. Therefore, it is predicted that the pressing force Nbp is equal to or smaller than the lower-limit pressing force NbpL at the third timing t13 being the re-drive point in time, so that the pressing force Nbp is increased by the execution of the re-drive processing (step S17). Thereafter, the function of the control device 200 is stopped (step S18).

Meanwhile, there is a case where even if an actual decreasing speed of the pressing force Nbp after the execution of the parking processing ends is higher than an assumed decreasing speed of the pressing force Nbp, and the actual pressing force becomes smaller than the lower-limit pressing force NbpL before the third timing t13 being the re-drive point in time, the rotation of the wheel 100 is not detected. In this case, the motor 31 is not re-driven until the third timing t13. That is, when the rotation of the wheel 100 is not detected between the end of the execution of the parking processing and the re-drive point in time, the re-driving of the motor 31 is executed for the first time at the re-drive point in time.

Second Embodiment

Next, a second embodiment embodying an electric parking brake device 10 is described with reference to FIGS. 7 and 8. The electric parking brake device 10 of this embodiment is different from that of the first embodiment in that a predetermined time TTH is variable and different in a method of calculating a reset pressing force NbpS. Therefore, in the following description, portions different from the first embodiment are mainly described, and the same reference signs are given to the same or corresponding member configurations as those of the first embodiment and the description thereof are not repeated.

In the electric parking brake device 10 of this embodiment, a pressing force increase amount ΔNbp is fixed to a predetermined value, and the predetermined time TTH is calculated on the basis of an initial pressing force NbpF which is a sum of the pressing force increase amount ΔNbp and a lower-limit pressing force NbpL and a decrease characteristic of the pressing force according to assumed temperature TMPAS. Specifically, in the control device 200, a map indicated by a solid line in FIG. 4 is prepared in advance. A length from timing at which a pressing force Nbp indicated in this map becomes equal to the sum of the lower-limit pressing force NbpL and the pressing force increase amount ΔNbp (that is, the initial pressing force NbpF) until timing at which the pressing force Nbp indicated in this map becomes equal to the lower-limit pressing force NbpL is made the predetermined time TTH. Therefore, the predetermined time TTH calculated in this manner corresponds to a prescribed time until a decrease amount of the pressing force Nbp becomes equal to the pressing force increase amount ΔNbp, and this is shorter as the lower-limit pressing force NbpL at that time is larger.

However, as in the case of the first embodiment described above, there is a case where rotation of a wheel 100 is detected before a re-drive point in time after execution of parking processing ends. In the electric parking brake device 10 of this embodiment also, corrected drive processing is executed with the detection of the rotation of the wheel 100 as a trigger. At that time, the reset pressing force NbpS is calculated prior to the execution of the corrected drive processing; the reset pressing force NbpS is set to be a sufficiently large value in order to eliminate the necessity of executing re-drive processing at the re-drive point in time.

Next, a processing routine executed by the control device 200 when the parking braking is executed is described with reference to a flowchart illustrated in FIGS. 7A and 7B.

As illustrated in FIG. 7A, the control device 200 obtains the initial pressing force NbpF by adding the lower-limit pressing force NbpL to the pressing force increase amount ΔNbp set in advance (step S111). Subsequently, the control device 200 calculates the predetermined time TTH on the basis of the map illustrated in FIG. 4 illustrating the decrease characteristic of the pressing force according to the assumed temperature TMPAS and the initial pressing force NbpF (step S112). Then, the control device 200 executes the parking processing of increasing the pressing force Nbp to the initial pressing force NbpF by the forward driving of the motor 31 (step S12). When the execution of the parking processing ends, the control device 200 determines whether the wheel speed VW of the wheel 100 detected by the wheel speed sensor 212 is equal to or higher than a rotation determination speed VWTH (step S13). In a case where the wheel speed VW is lower than the rotation determination speed VWTH (step S13: NO), the control device 200 determines whether an elapsed time T after the execution of the parking processing ends becomes equal to or longer than the predetermined time TTH (step S14). In a case where the elapsed time T is shorter than the predetermined time TTH (step S14: NO), the control device 200 shifts the procedure to step S13 described above.

On the other hand, in a case where the elapsed time T is equal to or longer than the predetermined time TTH (step S14: YES), the control device 200 executes the re-drive processing of increasing the pressing force Nbp to a stop holding pressing force NbpH being a sum of the lower-limit pressing force NbpL and an allowance increase amount ΔNbp1 by the forward driving of the motor 31 (step S17). When the execution of the re-drive processing ends, the control device 200 permits function stop (step S18), and ends this processing routine.

On the other hand, in a case where the wheel speed VW is equal to or higher than the rotation determination speed VWTH at step S13 (YES), the control device 200 calculates the reset pressing force NbpS such that the pressing force Nbp is equal to or larger than the stop holding pressing force NbpH at the re-drive point in time (step S151). That is, the control device 200 calculates a reference corrected pressing force based on the map illustrated in FIG. 4 illustrating the decrease characteristic of the pressing force according to the assumed temperature TMPAS and a remaining time (=TTH−T) according to difference obtained by subtracting a current elapsed time T from the predetermined time TTH. This reference corrected pressing force is a value which increases as the remaining time is longer, the value corresponding to the reset pressing force NbpS in the first embodiment described above. Subsequently, the control device 200 adds the allowance increase amount ΔNbp1 or a value larger than the allowance increase amount ΔNbp1 to this reference corrected pressing force, and sets the sum as the reset pressing force NbpS.

Then, the control device 200 executes corrected drive processing of increasing the pressing force Nbp to the reset pressing force NbpF by the forward driving of the motor 31 (step S161). When the execution of the corrected drive processing ends, the control device 200 determines whether the elapsed time T after the execution of the parking processing ends becomes equal to or longer than the predetermined time TTH (step S162). In a case where the elapsed time T is equal to or longer than the predetermined time TTH (step S162: YES), the control device 200 shifts the procedure to step S18 described above.

On the other hand, in a case where the elapsed time T is shorter than the predetermined time TTH (step S162: NO), the control device 200 determines whether the wheel speed VW of the wheel 100 detected by the wheel speed sensor 212 is not lower than the rotation determination speed VWTH (step S163). In a case where the wheel speed VW is equal to or higher than the rotation determination speed VWTH (step S163: YES), the control device 200 shifts the procedure to step S151 described above. On the other hand, in a case where the wheel speed VW is lower than the rotation determination speed VWTH (step S163: NO), the control device 200 shifts the procedure to step S162 described above.

An action of the electric parking brake device 10 of this embodiment is next described with reference to a timing chart illustrated in FIG. 8.

As illustrated in FIG. 8, when an operating unit 51 is turned on at first timing t21, the pressing force Nbp is increased up to the initial pressing force NbpF calculated prior to the execution of the parking processing by the execution of the parking processing (step S12). At that time, in a case where difference between actual temperature of the friction material 15 and outside air temperature TMPOS at the time of the execution of the parking processing is substantially equal to the assumed temperature TMPAS and a condition of an environment in which the electric parking brake device 10 is used is substantially the same as the above-described specific condition, the pressing force Nbp decreases in a mode indicated by a solid line in FIG. 8. Therefore, at third timing t23 at which the predetermined time TTH has elapsed after the first timing t21 (step S14: YES), the pressing force Nbp is substantially equal to the lower-limit pressing force NbpL. Then, there is a possibility that the wheel 100 to which a parking braking force is applied starts rotating at the third timing t23 being the re-drive point in time, so that the pressing force Nbp is increased by the execution of the re-drive processing (Step S17). Thereafter, the function of the control device 200 is stopped (step S18). Therefore, even in a case where the pressing force increase amount ΔNbp is fixed, an increase in power consumption at the time of parking may be suppressed by appropriately setting the predetermined time TTH.

On the other hand, there is a case where the electric parking brake device 10 is used under a condition that the brake pads 12 and 13 are more likely to be cooled than under the above-described specific condition, or the difference between the actual temperature of the friction material 15 and the outside air temperature TMPOS at the time of the execution of the parking processing is extremely larger than the assumed temperature TMPAS. In this case, as indicated by a dashed-two dotted line in FIG. 8, a decreasing speed of the pressing force Nbp is higher than an assumed decreasing speed (that is, the decreasing speed indicated by the solid line in FIG. 8). When the decreasing speed of the pressing force Nbp is high in this manner, the pressing force Nbp becomes smaller than the lower-limit pressing force NbpL before the third timing t23 being the re-drive point in time, and the wheel 100 starts rotating at second timing t22 before the third timing t23 (step S13: YES). Then, at the second timing t22, the pressing force Nbp is increased by the execution of the corrected drive processing (step S161).

Meanwhile, the reset pressing force NbpS is calculated such that the pressing force Nbp is equal to or larger than the stop holding pressing force NbpH at the third timing t23 being the re-drive point in time (step S151). In a case where the corrected drive processing is executed in this manner, at the third timing t23, the function of the control device 200 is stopped without the execution of the re-drive processing (step S18). That is, as compared to a case where the re-drive processing is necessarily executed at the re-drive point in time regardless of whether the corrected drive processing is executed, an increase in the number of time of driving of the motor 31 is suppressed.

Meanwhile, each of the above-described embodiments may be modified to another embodiment as follows.

The assumed temperature TMPAS may be arbitrary temperature as long as this is set to a value lower than the maximum value of the temperature which the friction material 15 may reach in design. For example, a value of the average temperature of the friction material 15 when the friction material 15 is used at the time of vehicle braking or a value according to the average temperature may be made the assumed temperature TMPAS.

The assumed temperature TMPAS may be made equal to the maximum value of the temperature which the friction material 15 may reach in design. Especially, in a case where a friction material having a maximum value of temperature which this may reach in design is not so high is used as the friction material 15, even if the assumed temperature TMPAS is made equal to the maximum value, difference between the actual temperature of the friction material 15 and the outside air temperature TMPOS at the time of the execution of the parking processing hardly deviates from the assumed temperature TMPAS. That is, the initial pressing force NbpF calculated on the basis of the assumed temperature TMPAS (=maximum value) never becomes excessively large.

In each of the above-described embodiments, the initial pressing force NbpF or the predetermined time TTH is calculated by taking into account the decrease in the pressing force Nbp caused by the decrease in temperature of the friction material 15 of the brake pads 12 and 13. However, in a case where the friction material 15 is pressed against the brake disc 11, the temperature of not only the friction material 15 but also the brake disc 11 increases. Furthermore, there is a case where the temperature of the back plate 14 and the caliper 16 supporting the friction material 15 also increases. The pressing force Nbp might decrease due to the decrease in temperature of components of the disc brake other than the friction material 15.

Meanwhile, the cooling characteristic, that is, the contraction characteristic under the specific condition of the brake unit including the friction material 15, the back plate 14, the brake disc 11, the caliper 16 and the like may be grasped in advance. Therefore, it is also possible to calculate the initial pressing force NbpF or the predetermined time TTH by taking into account a decrease component of the pressing force Nbp caused by the decrease in temperature of various components of the brake unit.

In each of the embodiments described above, the initial pressing force NbpF is calculated by using the map, but the initial pressing force NbpF may also be calculated by using an arithmetic expression representing the decrease characteristic of the pressing force according to the assumed temperature TMPAS.

In a case where the corrected drive processing is executed with the detection of the rotation of the wheel 100 after the execution of the parking processing and before the re-drive point in time as a trigger, there is a case where the electric parking brake device 10 is used under the condition in which the temperature is likely to decrease as compared to the specific condition or the difference between the actual temperature of the friction material 15 and the outside air temperature TMPOS at the time of the execution of the parking processing is larger than the assumed temperature TMPAS. Therefore, in the first embodiment, even if the corrected drive processing is executed on the basis of the reset pressing force NbpS set with reference to the map illustrated in FIG. 4, there is a possibility that the actual pressing force Nbp becomes smaller than the lower-limit pressing force NbpL again before the re-drive point in time. Therefore, it is possible to add an offset value to the reset pressing force NbpS set with reference to the map illustrated in FIG. 4 and make the sum the reset pressing force after correction, and in the corrected drive processing, the pressing force Nbp may be increased to the reset pressing force after correction. In this case, the offset value may be set to a larger value as the remaining time being difference obtained by subtracting the elapsed time T at that time from the predetermined time TTH is longer. As a result, it is possible to prevent the corrected drive processing from being executed a plurality of number of times within the period from the end of the execution of the parking processing to the re-drive point in time, and it is possible to suppress an increase in opportunity of driving of the motor 31.

In the first embodiment, the reset pressing force NbpS may be set to an arbitrary value as long as the rotation of the wheel 100 may be stopped. For example, the reset pressing force NbpS may be set to a smaller value than the value set with reference to the map illustrated in FIG. 4. In this case, the pressing force at a predicted re-drive point in time becomes smaller than the lower-limit pressing force NbpL.

As described above, in a case where the corrected drive processing is executed with the detection of the rotation of the wheel 100 after the execution of the parking processing and before the re-drive point in time as a trigger, there is a case where the electric parking brake device 10 is used under the condition in which the temperature is likely to decrease as compared to the specific condition or the actual temperature of the friction material 15 at the time of execution of the parking processing is higher than the assumed temperature TMPAS. Therefore, in the second embodiment, it is possible to determine that the decrease amount of the pressing force Nbp is larger than the assumed amount in a case where the corrected drive processing is executed, so that the allowance increase amount ΔNbp1 may be set to a larger value as compared to a case where the corrected drive processing is not executed until the re-drive point in time.

In the first embodiment, the initial pressing force NbpF is calculated such that the pressing force Nbp becomes equal to the lower-limit pressing force NbpL at the re-drive point in time. However, since it is only necessary to increase the possibility that the wheel 100 starts rotating at the re-drive point in time, the initial pressing force NbpF may be calculated to such a value that the pressing force Nbp is slightly smaller than the lower-limit pressing force NbpL at the re-drive point in time.

In the second embodiment, the predetermined time TTH is calculated such that the pressing force Nbp becomes equal to the lower-limit pressing force NbpL at the re-drive point in time. However, since it is only necessary to increase the possibility that the wheel 100 starts rotating at the re-drive point in time, the predetermined time TTH may be set such a value that the pressing force Nbp is slightly smaller than the lower-limit pressing force NbpL at the re-drive point in time.

In the second embodiment, the predetermined time TTH may be calculated after the execution of the parking processing ends. For example, in the processing routine illustrated in FIG. 7A, the order of execution of step S112 of calculating the predetermined time TTH and step S12 of executing the parking processing may be interchanged with each other.

In the second embodiment, when the rotation of the wheel 100 is detected before the re-drive point in time, the reset pressing force NbpS is set such that the pressing force Nbp is equal to or smaller than the lower-limit pressing force NbpL at the re-drive point in time, and the corrected drive processing may be executed thereafter. In this case, the re-drive processing is executed at the reset point in time.

In the first embodiment, when the rotation of the wheel 100 is detected before the re-drive point in time, the reset pressing force NbpS may be set to be an extremely large value such that it is not required to execute the re-drive processing at the re-drive point in time. In this case, it is not necessary to execute the re-drive processing at the re-drive point in time.

The electric parking brake device may be a device having a configuration other than that of the electric parking brake device 10 described in each of the above-described embodiments as long as this is the device having a configuration such that the pressing force decreases due to the decrease in temperature of the friction material pressed against the rotating body which rotates integrally with the wheel 100.

The invention claimed is:

1. An electric parking brake device comprising:
   a rotating body integrally rotating with a wheel;
   a friction material;
   a motor;
   a shaft member which moves in an axial direction by driving of the motor to press the friction material against the rotating body; and
   a control device which moves the shaft member by the driving of the motor, thereby pressing the friction material against the rotating body to generate a pressing force,
   wherein,
   the control device is configured to execute parking processing and re-drive processing, the parking processing comprising increasing the pressing force to an initial pressing force larger than a lower-limit pressing force by driving the motor, the lower-limit pressing force being a lower-limit value of the pressing force capable of holding a stopping state of a vehicle, and the re-drive processing comprising increasing the pressing force by driving the motor at a re-drive point in time at which a predetermined time has elapsed after the end of execution of the parking processing,
   the control device is configured to, when executing the parking processing, 1) calculate the initial pressing force on the basis of the predetermined time and an assumed time-based decrease of the pressing force such that the pressing force is not larger than the lower-limit pressing force at the re-drive point in time, or 2) calculate the predetermined time on the basis of the initial pressing force and the assumed time-based decrease of the pressing force such that the pressing force is not larger than the lower-limit pressing force at the re-drive point in time, and the control device is configured to, when rotation of the wheel is detected in a situation in which elapsed time from the end of the execution of the parking processing is shorter than the predetermined time, calculate a reset pressing force on the basis of time from when the rotation of the wheel is detected to the re-drive point in time and the assumed time-based decrease of the pressing force such that the pressing force is not larger than the lower-limit pressing force at the re-drive point in time, and then drive the motor to increase the pressing force to the reset pressing force.

2. The electric parking brake device according to claim 1, wherein the assumed temperature is set to a value smaller than a maximum value of temperature which the friction material may reach.

3. An electric parking brake device comprising:
a rotating body integrally rotating with a wheel;
a friction material;
a motor;
a shaft member which moves in an axial direction by driving of the motor to press the friction material against the rotating body; and
a control device which moves the shaft member by the driving of the motor, thereby pressing the friction material against the rotating body to generate a pressing force,
wherein,
the control device is configured to execute parking processing and re-drive processing, the parking processing comprising increasing the pressing force to an initial pressing force lamer than a lower-limit pressing force by driving the motor, the lower-limit pressing force being a lower-limit value of the pressing force capable of holding a stopping state of a vehicle, and the re-drive processing comprising increasing the pressing force by driving the motor at a re-drive point in time at which a predetermined time has elapsed after the end of execution of the parking processing, the control device is configured to, when executing the parking processing, 1) calculate the initial pressing force on the basis of the predetermined time and an assumed time-based decrease of the pressing force such that the pressing force is not larger than the lower-limit pressing force at the re-drive point in time, or 2) calculate the predetermined time on the basis of the initial pressing force and the assumed time-based decrease of the pressing force such that the pressing force is not lamer than the lower-limit pressing force at the re-drive point in time, the control device is configured to, when executing the re-drive processing, drive the motor to increase the pressing force to a stop holding pressing force, the stop holding pressing force being a sum of the lower-limit pressing force and an allowance increase amount, the control device is configured to, when rotation of the wheel is detected in a situation in which elapsed time from the end of the execution of the parking processing is shorter than the predetermined time, calculate a reset pressing force on the basis of time from when rotation of the wheel is detected to the re-drive point in time, the assumed time-based decrease characteristic of the pressing force, and the stop holding pressing force such that the pressing force is not smaller than the stop holding pressing force at the re-drive point in time, and then drive the motor to increase the pressing force to the reset pressing force, and when the motor is driven because the rotation of the wheel is detected before the re-drive point in time, the control device does not execute the re-drive processing even if the re-drive point in time is reached.

4. The electric parking brake device according to claim 3, wherein the assumed temperature is set to a value smaller than a maximum value of temperature which the friction material may reach.

* * * * *